US008309850B2

(12) United States Patent
Henry

(10) Patent No.: US 8,309,850 B2
(45) Date of Patent: Nov. 13, 2012

(54) MODULAR COVER FOR CABLE CONNECTORS AND ACCESSORIES

(75) Inventor: Stephen K. Henry, Boulder, CO (US)

(73) Assignee: Checkers Industrial Products, LLC, Broomfield, CO (US)

( * ) Notice: Subject to any disclaimer, the term of this patent is extended or adjusted under 35 U.S.C. 154(b) by 0 days.

(21) Appl. No.: 12/686,702

(22) Filed: Jan. 13, 2010

(65) Prior Publication Data

US 2011/0171852 A1 Jul. 14, 2011

(51) Int. Cl.
*H02G 3/04* (2006.01)

(52) U.S. Cl. ........................ 174/68.1; 174/135; 439/488

(58) Field of Classification Search .................. 174/135, 174/68.1; 439/488
See application file for complete search history.

(56) References Cited

U.S. PATENT DOCUMENTS

| | | | | |
|---|---|---|---|---|
| 5,095,822 | A * | 3/1992 | Martin | 104/275 |
| 5,777,266 | A * | 7/1998 | Herman et al. | 174/68.1 |
| 6,252,164 | B1 | 6/2001 | Wise | |
| 6,481,036 | B1 * | 11/2002 | Duvall | 14/69.5 |
| 7,332,672 | B2 | 2/2008 | Henry | |
| 7,531,746 | B2 | 5/2009 | Henry | |

* cited by examiner

*Primary Examiner* — Renee Iuebke
*Assistant Examiner* — Larisa Tsukerman
(74) *Attorney, Agent, or Firm* — Holland & Hart

(57) ABSTRACT

A cable connector cover for use with modular cable protectors includes a bottom recess for housing cables and cable connectors. The cable protector cover also has a number of openings to provide access into the bottom recess. These openings are adjacent to the connectors and are aligned with the channels of the cable protectors to allow cables to run from the cable protectors into the recess. The upper portion of the cable connector cover can extend upward to a sufficient height to provide a visual indicator to passersby.

23 Claims, 8 Drawing Sheets

*Fig. 5*
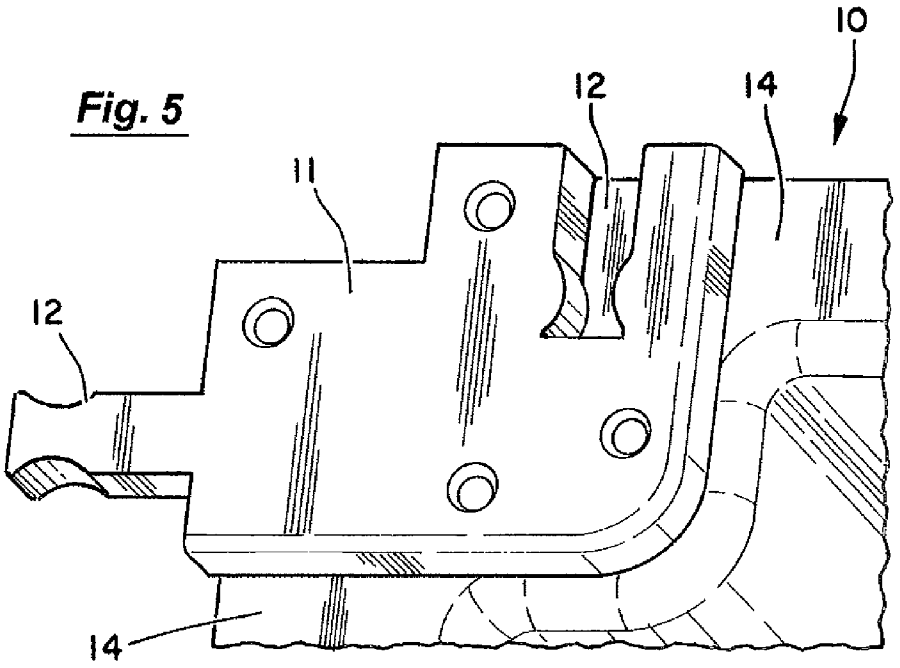
16
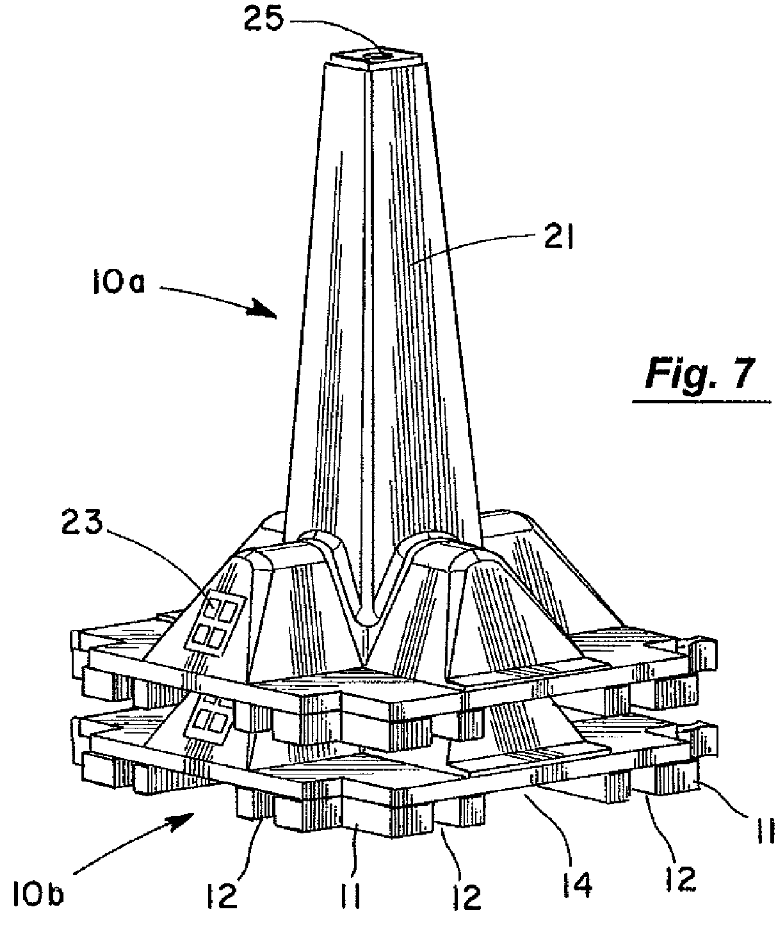
*Fig. 7*

MODULAR COVER FOR CABLE CONNECTORS AND ACCESSORIES

BACKGROUND OF THE INVENTION

1. Field of the Invention

The present invention relates generally to the field of cable protectors. More specifically, the present invention discloses a modular cover for use between modular cable protectors that provides a visual indicator to passersby, provides a storage area for excess cables, cable connectors, plugs or power distribution boxes, and also allows for connection of cable protectors with different connector shapes.

2. Statement of the Problem

Hose and cable bridging protective devices have been used in the past to prevent damage for hoses, cables, wiring and the like by vehicles and pedestrians. These cable protectors also help to minimize the risk of pedestrians tripping over cables. For the purposes of this disclosure, the term "cable" should be broadly interpreted to include cables, hoses, electrical wiring, conduits, optical fibers, pneumatic tubing, plumbing, and the like.

Many conventional cable protectors include one or more channels extending in parallel between the ends of the cable protector to receive the cables. A hinged lid can be used to cover the channels and serve as the top surface of the cable protector. Side ramps or beveled edges extend laterally outward from both sides of the cable protector to allow vehicles to roll over the top of the cable protector. Each cable protector typically includes a set of end connectors that enable a series of cable protectors to be attached together in a modular end-to-end fashion to any desired length.

Other cable protectors have channels that facilitate cables carried in other patterns, such as Y, X or T-shaped configurations, or 45° or 90° turns. However, these often require extra space within the cable protector to accommodate connection plugs, electrical junctions, extra cable and the like. In addition, it is often advantageous to be able to prominently mark such junctions for the benefit of workers and to warn passersby.

Traditionally, cable protectors have been designed to maintain as low a profile as possible to minimize the risk that pedestrians might trip or stumble over the cable protector. A low-profile cable protector is also beneficial in reducing the degree of obstruction presented to vehicles, and in particular wheel chairs, crossing over the cable protector. Thus, maintaining a minimal height has traditionally been one of the major goals in designing cable protectors. Creating a cable protector with components that intentionally extend upward to a significant height would be counter to the conventional wisdom in this field.

The applicant's U.S. Pat. Nos. 7,332,672 and 7,531,746 (Henry) disclose modular cable protectors with a raised barrier lid. The lid can include a recess to hold cables and cable connectors. However, these cable protectors still require a base with end connectors to engage neighboring cable protectors, which adds cost, weight and complexity.

Thus, there continues to be a need for a cost-effective cable connector cover for protect cables and cable connectors that can join conventional modular cable protectors and also provides a visual indicator to passersby.

3. Solution to the Problem

The present invention addresses these shortcomings of the prior art by providing a cable connector cover suitable for use with modular cable protectors in which excess cables, cable connectors, plugs and electrical distribution boxes can be stored in a recess in the bottom of the cable connector cover.

In addition, the cable connector cover is equipped with connectors suitable for engaging the end connectors of adjacent modular cable protectors to facilitate assembly of these components in any desired configuration. Also, the upper portion of the cable connector cover serves as a visual indicator to passersby. For example, the upper portion of the cable connector cover can be decorated with graphics to direct or warn pedestrians.

In addition, the cable connector cover can be molded from plastic with a thin shell construction. This allows the cable connector cover to be light weight and stackable to simplify transportation and storage between use.

SUMMARY OF THE INVENTION

This invention provides a cable connector cover for use with modular cable protectors that includes a recess under the cable connector cover for housing cables and cable connectors, and has connectors for removably engaging end connectors of adjacent cable protectors. Openings extend through the cable protector cover into the recess adjacent to the connectors and are aligned with the channels of the cable protectors to allow cables to run from the cable protectors into the recess. The upper portion of the cable connector cover can extend upward to a sufficient height to provide a visual indicator to passersby.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 5 is a bottom perspective view of one of the foot assemblies 11 of the cable connector cover 10.

FIG. 7 is a perspective view of two cable connector covers 10*a*, 10*b* stacked atop one another.

DETAILED DESCRIPTION OF THE INVENTION

Figure 1:
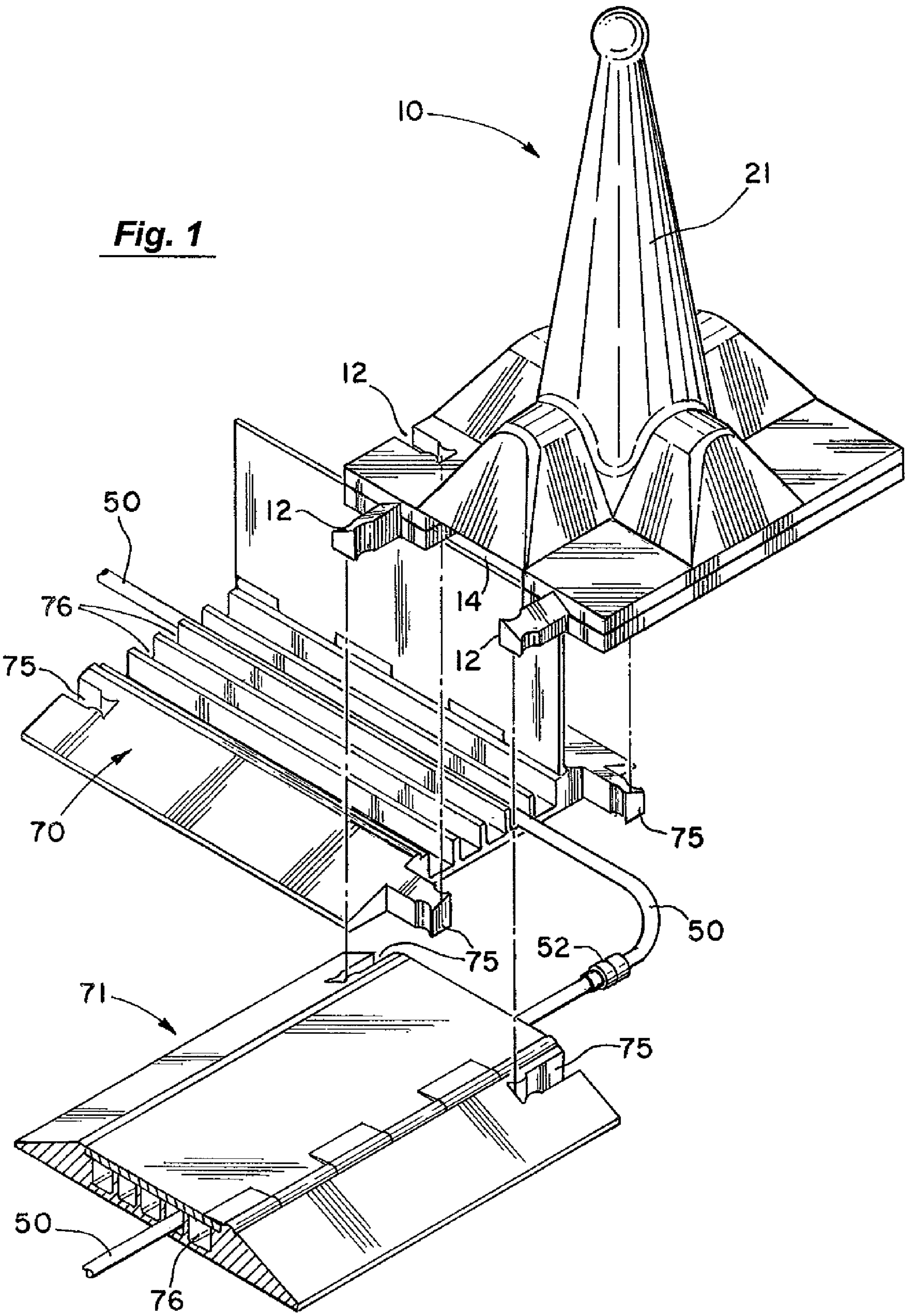
FIG. 1 is an exploded perspective view of a cable connector cover 10 embodying the present invention connected to two modular cable protectors 70, 71.
Figure 2:
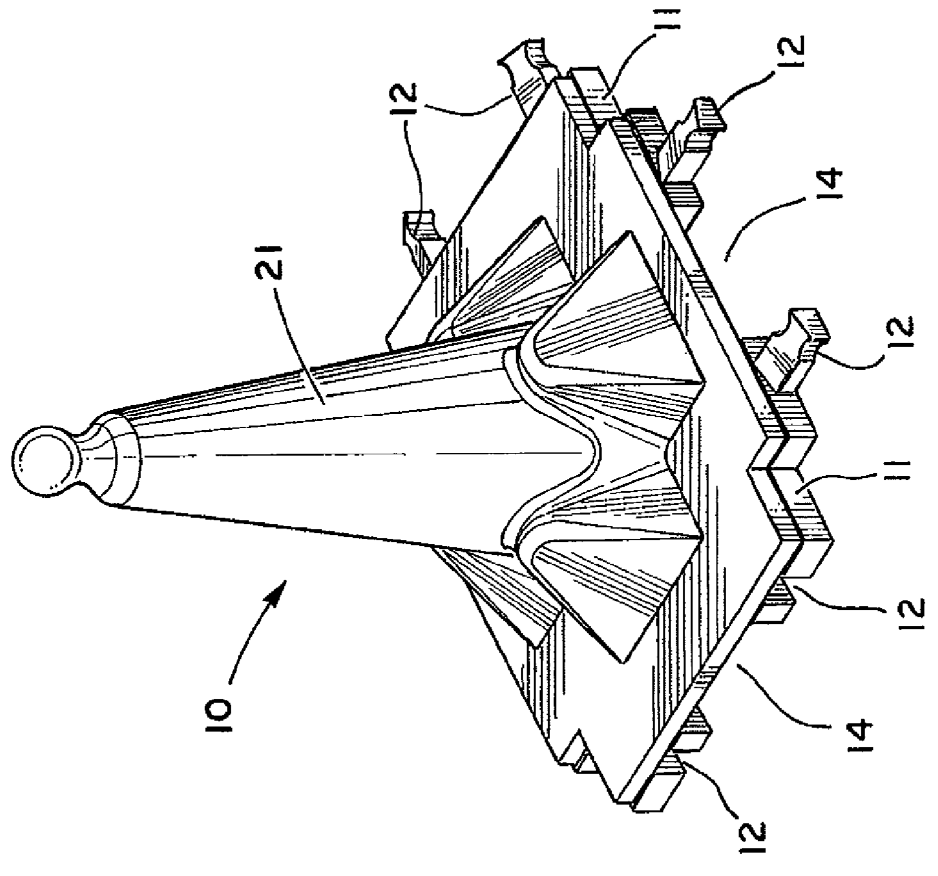
FIG. 2 is a perspective view of an embodiment of the cable connector cover 10 intended to join four modular cable protectors.
Figure 4:
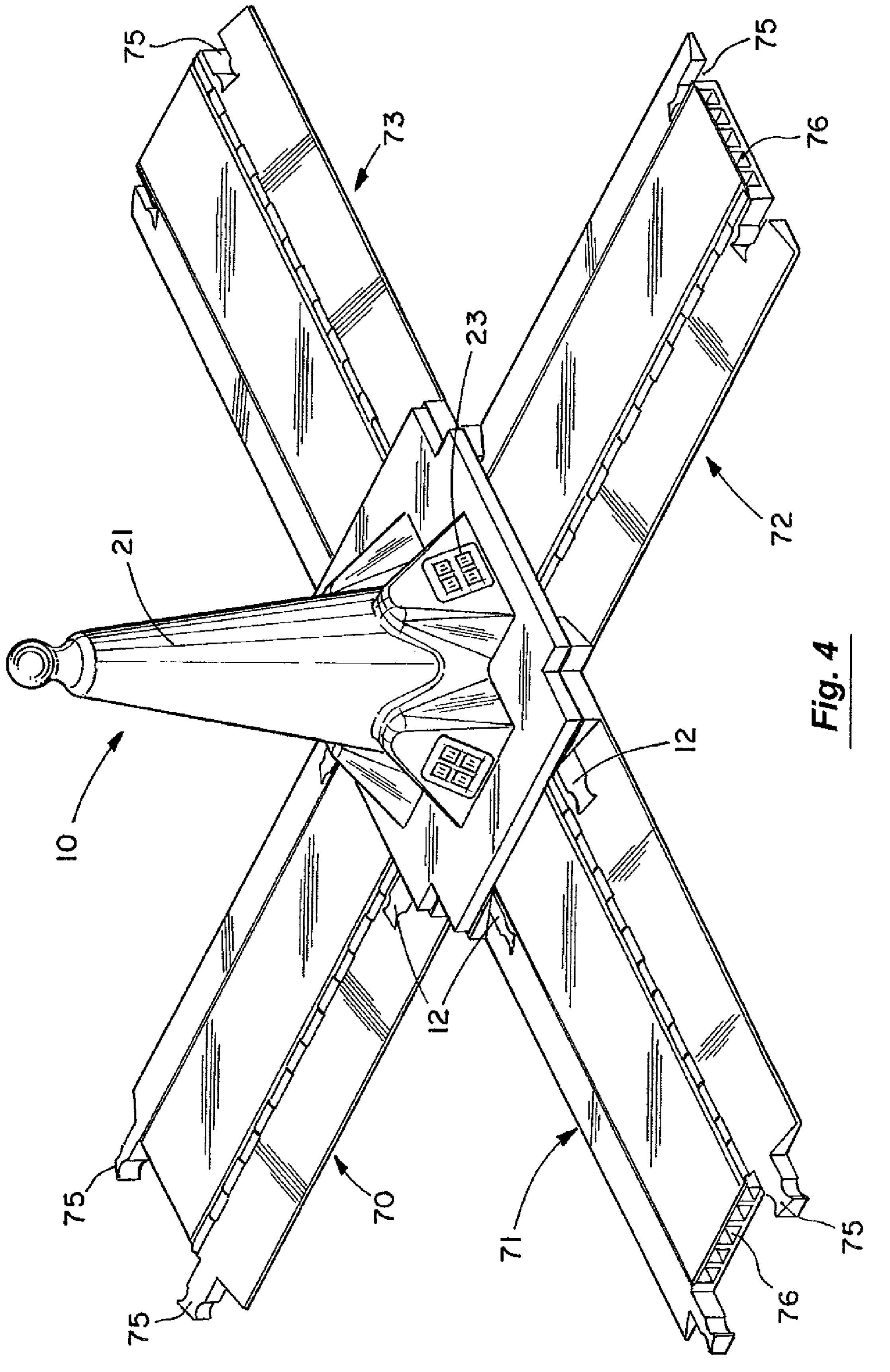
FIG. 4 is a perspective view of the cable connector cover 10 shown in FIGS. 2 and 3 assembled with four cable protectors 70-73.

Turning to FIG. 1, an exploded perspective view is shown of a cable connector cover 10 joining two modular cable protectors 70 and 71 in an L-shaped configuration. The figures show the cable connector cover 10 having a single piece construction. FIG. 2 is a perspective view of an embodiment of a cable connector cover 10 intended to join four modular cable protectors in an X-shaped configuration. FIG. 4 shows an example of this X-shaped configuration for connecting up to four adjacent cable protectors 70-73. It should be understood that the present invention is intended to be modular and to allow interconnection with cable protectors in virtually any desired arrangement. Other embodiments of the cable connector cover 10 can provide Y or T-shaped patterns, a linear pattern, 45° turns, or other types of splits or configurations for the adjacent modular cable protectors.

The lower portion of the cable connector cover 10 is designed to sit directly on the ground and occupy the space at the juncture of two or more modular cable protectors. The lower portion of the cable protector can be equipped with connectors 12 to removably engage corresponding end connectors 75 on the adjacent modular cable protectors. For example, these connectors 12 can be T-shaped or have a dog-bone shape for compatibility with the end connectors on modular cable protectors that are widely used in the industry. Different combinations of connectors 12 could also be used to connect unlike modular cable protectors with different end connectors 75.

Figure 1A:
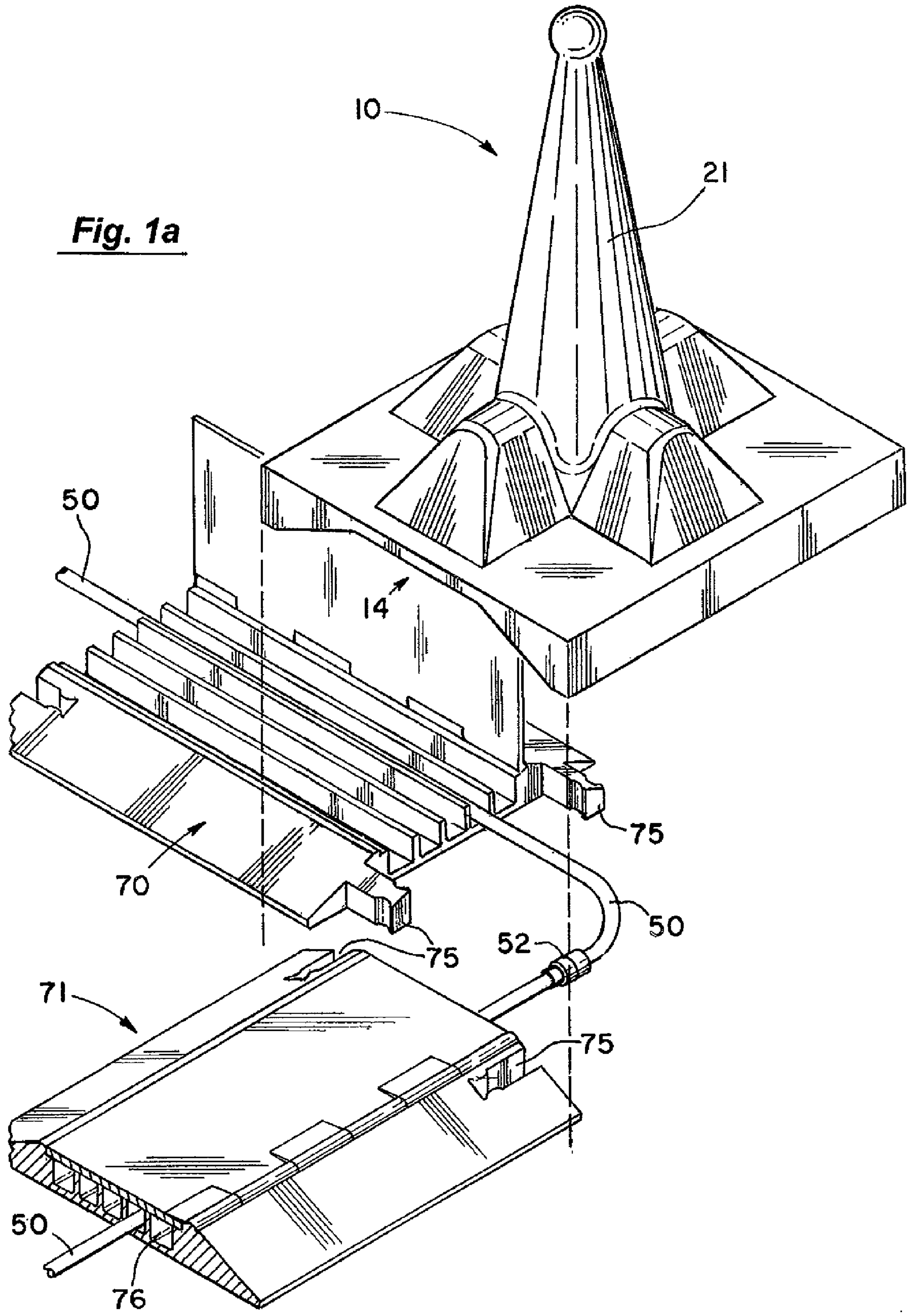
FIG. 1*a* is an exploded perspective view of an embodiment of a cable connector cover 10 without end connectors that is designed to seat over the ends of two modular cable protectors 70 and 71.

Alternatively, the connectors 12 shown in FIG. 1 can be omitted. For example, FIG. 1*a* is an exploded perspective view of an embodiment of a cable connector cover 10 without connectors that is designed to seat over the ends of two modular cable protectors 70 and 71. The bottom surface of the edges of the cable connector cover 10 is shaped to complement upper surface of a modular cable protector 70, 71.

Figure 3:
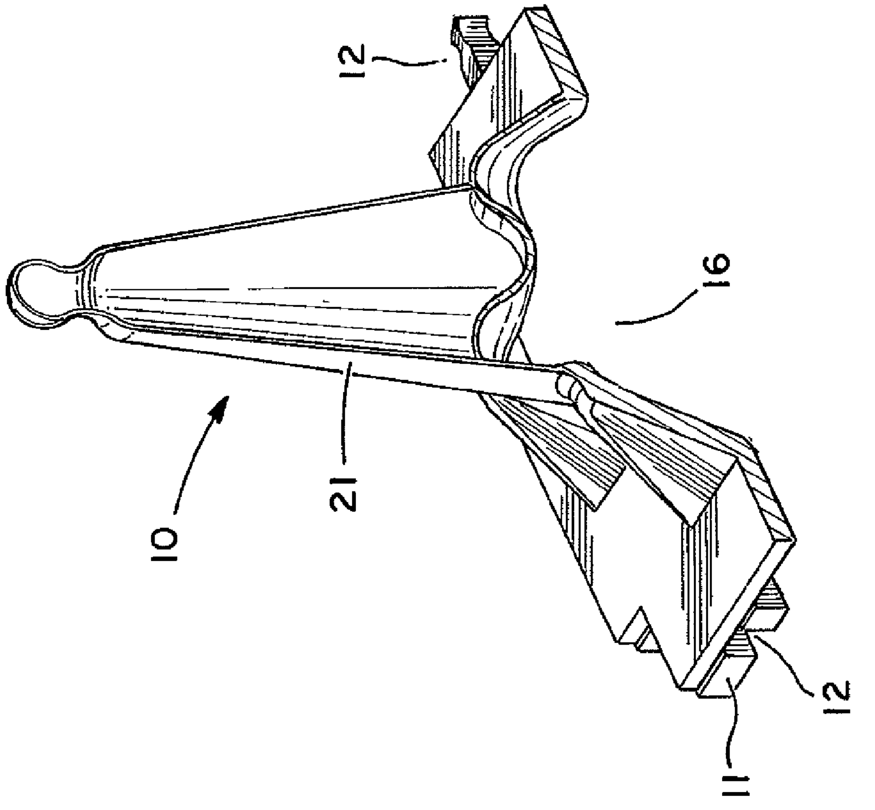
FIG. 3 is a cut-away perspective view of the cable connector cover 10 corresponding to FIG. 2.

FIG. 3 is a cut-away perspective view of the cable connector cover 10 corresponding to FIG. 2. The recess 16 is shown in the figures facing downward in a direction facing the ground upon which the cable connector cover 10 sits. A recess 16 is formed in the bottom of the cable connector cover 10 for housing cables 50 and cable plugs 52. Openings 14 extend through the lower portion of the cable connector cover 10 into the bottom recess 16 adjacent to the connectors 12. These openings 14 are aligned with the channels 76 of each of the adjacent cable protectors to allow cables 50 to run from the cable protectors into the recess 16. The figures show openings 14 facing in a lateral direction along the side surfaces of the cable connector cover 10.

The upper portion 21 of the cable connector cover 10 can be molded as a thin shell (e.g., plastic). The upper portion 21 extends upward to a sufficient height to provide a visual indicator to passersby. For example, the interior of the upper portion 21 of the cable connector cover 10 can be a continuation of the bottom recess 16 as illustrated in FIG. 3. In particular, the upper portion can have a tapered hollow interior extending the bottom recess upward within the upper portion of the cable connector cover, so that a plurality of cable connector covers 10*a* and 10*b* can be stacked atop one another, as shown in FIG. 7. This simplifies transportation and storage of a large number of cable connector covers.

The lower portion of the cable connector cover 10 may require a sturdier construction than the upper portion 21 to withstand the stresses associated with the connectors 12. Therefore, heavier foot assemblies 11 that incorporate the connectors 12 can be manufactured separately and then secured to the bottom of the cable connector cover 10 as shown in FIG. 5. It should also be noted that the foot assemblies 11 can have any of a variety of possible configurations. For example, separate foot assemblies 11 can be bolted to the underside of the cable connector cover 10 at each corner. Alternatively, two parallel foot assemblies can be attached along opposing edges of the underside of the cable connector cover 10, or a single foot assembly can be employed to provide all of the required connectors 12.

Figure 6:
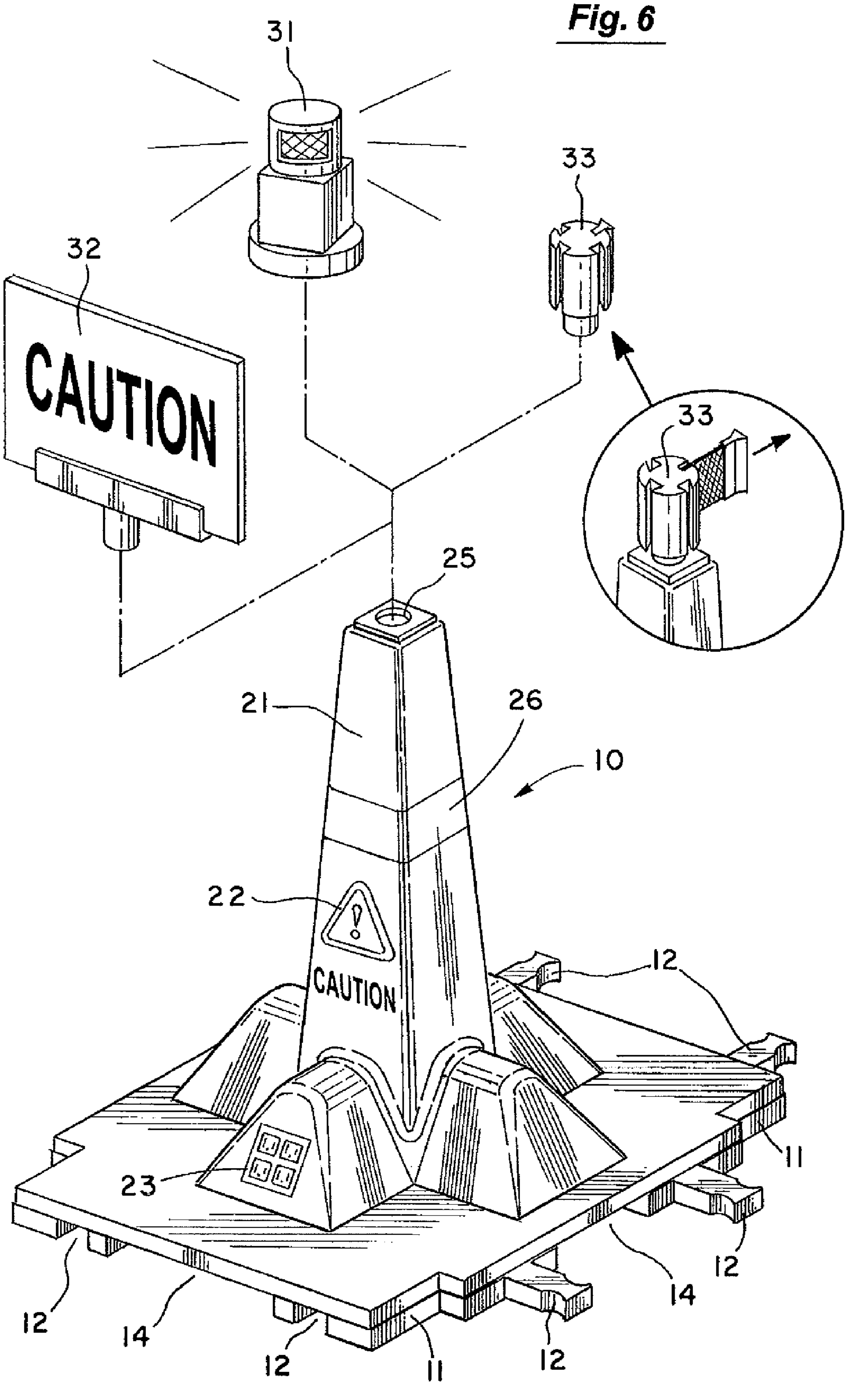
FIG. 6 is an exploded perspective view of another embodiment of the cable connector cover 10 with interchangeable attachments 31, 32, and 33 that can be connected to the top of the cable connector cover 10.

Several embodiments of the upper portion 21 of the cable connector cover 10 are shown in drawings. In the embodiment depicted in FIG. 1, the upper portion 21 of the cable connector cover 10 is generally cone-shaped. The cone-shaped upper portion itself can serve as the visual indicator, or it can be decorated with graphics 22 (e.g., a sign or directional arrow as shown in FIG. 6) to warn passersby or direct traffic. Reflective tape 26 can also be applied to selected areas of the upper portion of the cable connector cover 10, as shown in FIG. 6. In this embodiment, the cable connector cover 10 has a height sufficient to store excess cables, connectors and plugs in its bottom recess 16, and to help ensure visibility and minimize the risk of being a trip hazard. However, it should be understood that the upper portion 21 of the cable connector cover 10 could have any desired shape.

Another embodiment is shown in FIG. 6, in which the upper portion 21 of the cable connector cover 10 has a generally square cross-section with four relatively flat surfaces or walls for displaying graphics 22 to provide information to passersby. This embodiment also includes an attachment connector 25 on the top of the cable connector cover 10 to accommodate a variety of interchangeable attachments, such as a light 31, sign 32, retractable ribbon 33, or a proximity-triggered audio alarm. For example, the retractable ribbon 33 can be extended to serve as a flexible member marking a traffic pathway. The upper portion 21 of the cable connector cover 10 can also be equipped with electrical outlets 23 powered by one or more of the electrical cables 50 via the bottom recess 16.

Figure 8:
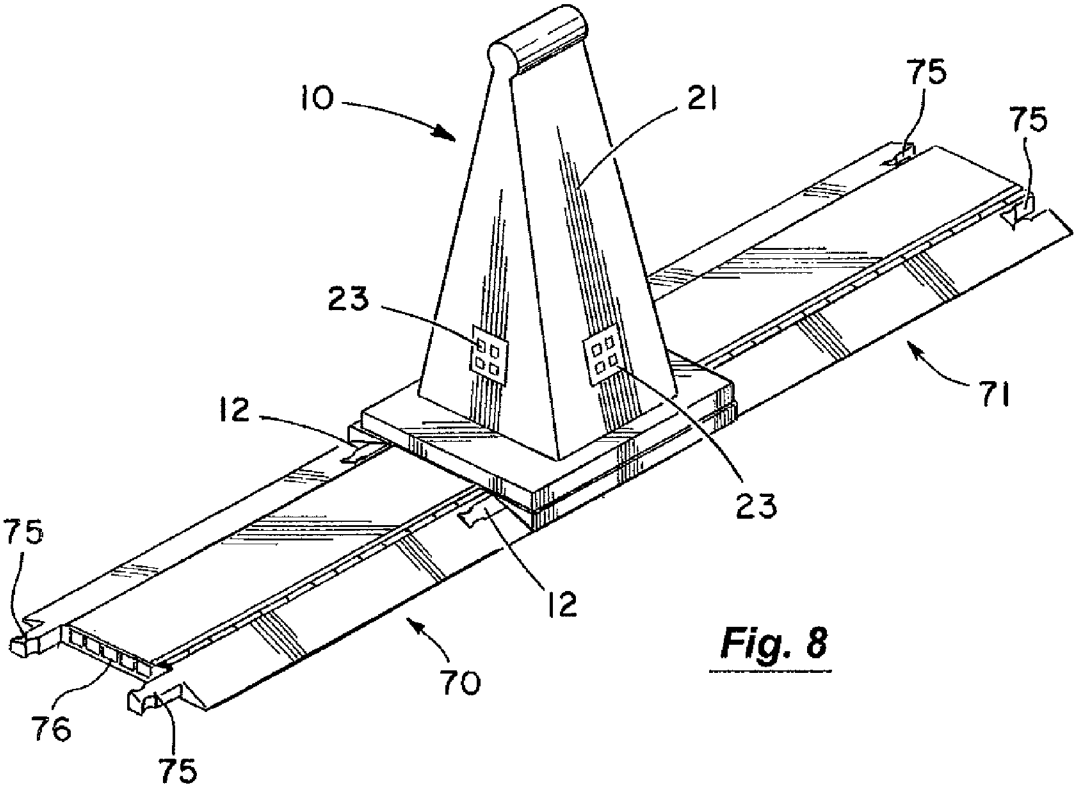
FIG. 8 is a perspective view of another embodiment of the cable connector cover 10 connected to two modular cable protectors 70, 71 in a linear configuration.
Figure 9:
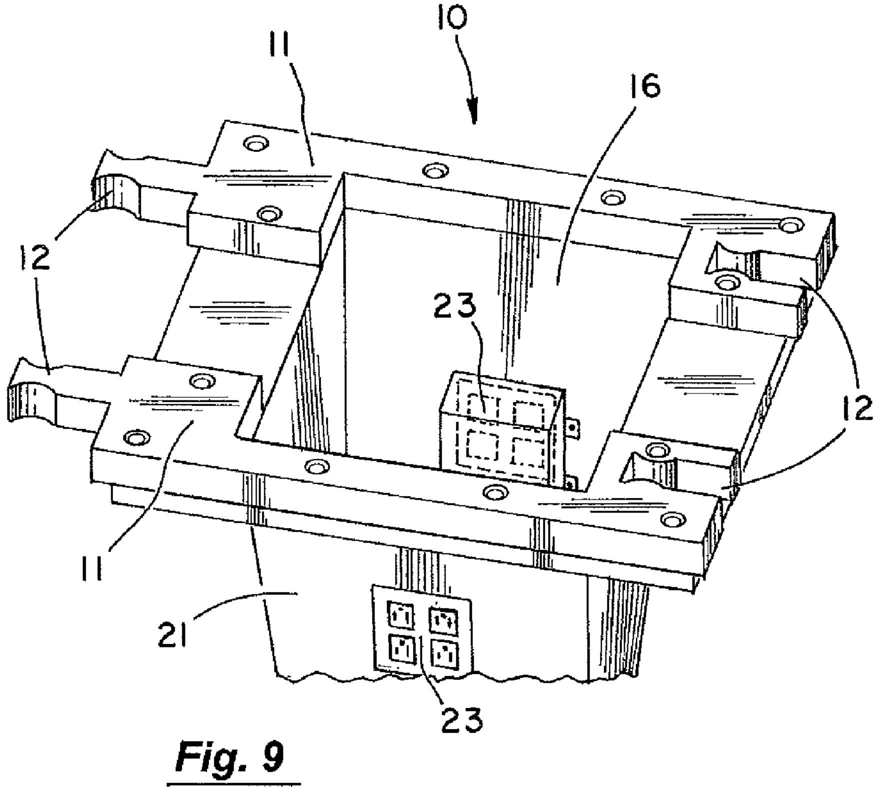
FIG. 9 is a detail bottom perspective view of cable connector cover 10 in FIG. 8 showing its foot assemblies 11.

FIGS. 8 and 9 show another embodiment of the present invention in which the upper portion 21 of the cable connector cover 10 is somewhat elongated to form a wall extending along the axis of the adjacent cable protectors 70 and 71. The top edge of the wall can be shaped to serve as a hand rail or grip. The flat surfaces of the cable connector cover 10 can be bear graphics or electrical outlets 23.

Figures 10, 11:
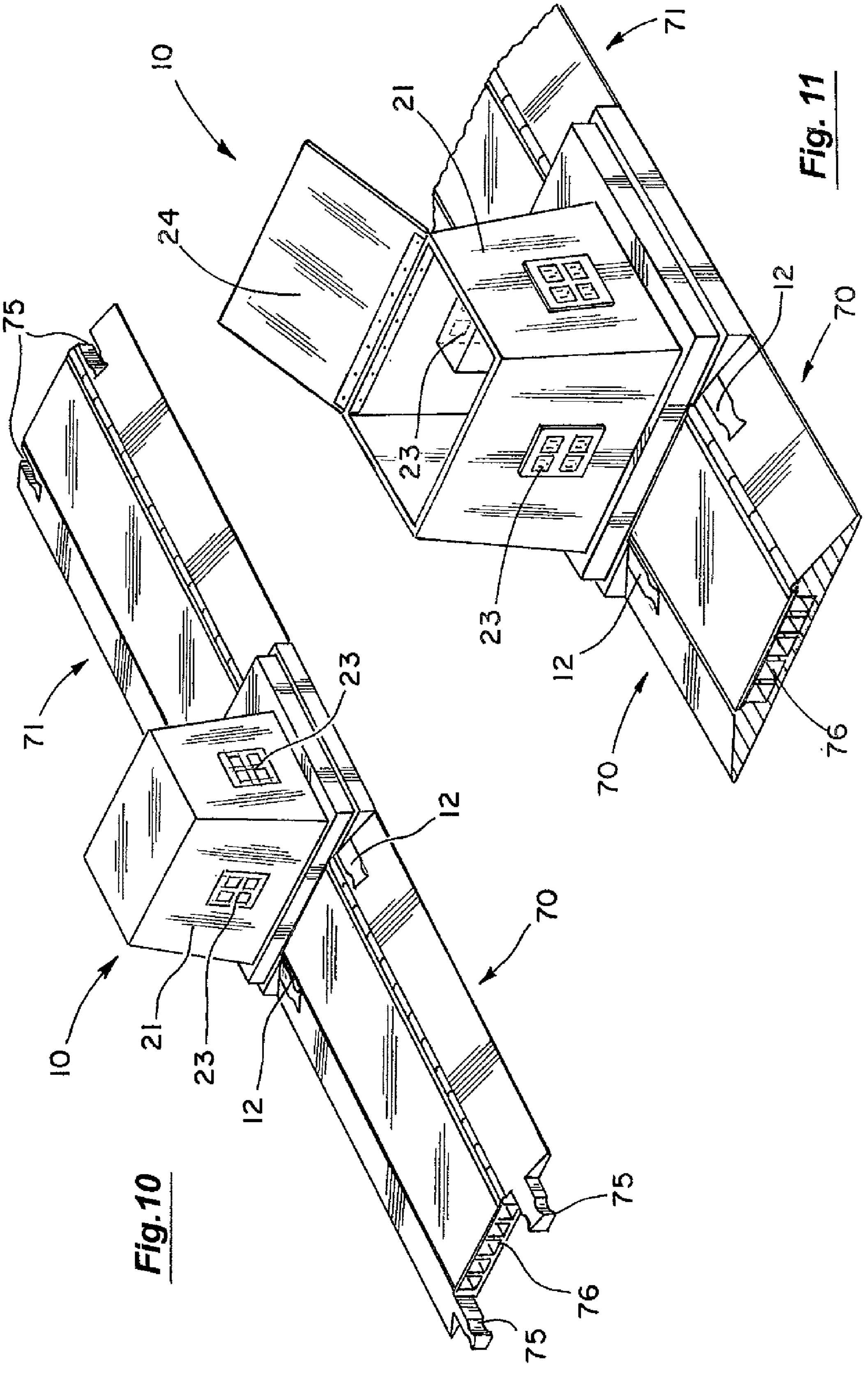
FIG. 10 is a perspective view of another embodiment of the cable connector cover 10 having a box-shaped upper portion.
FIG. 11 is a perspective view of another embodiment of the cable connector cover 10 having a box-shaped upper portion with a lid 24.

FIGS. 10 and 11 show others embodiments of the present invention in which the upper portion 21 of the cable connector cover 10 is box-shaped. For example, these embodiments can be used to cover a conventional electrical power distribution box. The embodiment in FIG. 11 includes a lid 24 in the upper portion 21 of the cable connector cover 10 to provide access to a power distribution box within.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A cable connector cover for use with modular cable protectors having end connectors and channels for carrying cables, said cable connector cover comprising:

a recess in the bottom of the cable connector cover for housing cables and cable connectors, the recess facing downward;

end connectors on a lower portion of the cable connector cover removably engaging end connectors of adjacent cable protectors;

openings extending through the cable connector cover into the recess, aligned with the channels of the cable protectors allowing cables to run from the cable protectors into the recess; and an upper portion extending upward to a sufficient height to provide a visual indicator to passersby;

wherein the cable connector cover comprises a single piece construction.

2. The cable connector cover of claim 1 wherein the upper portion is cone-shaped.

3. The cable connector cover of claim 1 wherein the upper portion is wall-shaped.

4. The cable connector cover of claim 1 further comprising visual graphics on the upper portion providing information to passersby.

5. The cable connector cover of claim 1 further comprising a connector on the upper portion for removably securing an attachment to the cable connector cover.

6. The cable connector cover of claim 5 wherein the attachment comprises a light.

7. The cable connector cover of claim 5 wherein the attachment comprises a sign.

8. The cable connector cover of claim 5 wherein the attachment comprises an alarm.

9. The cable connector cover of claim 5 wherein the attachment comprises a flexible member for marking a traffic pathway.

10. The cable connector cover of claim 1 further comprising an electrical outlet.

11. The cable connector cover of claim 1 wherein the openings face laterally.

12. A cable connector cover for use with modular cable protectors having end connectors and channels for carrying cables, said cable connector cover comprising:

a bottom recess for housing cables and cable connectors, the bottom recess being formed in a bottom surface of the cable connector cover and facing downward;

end connectors on a lower portion of the cable connector cover removably engaging end connectors of adjacent cable protectors;

openings formed in the bottom surface of the cable connector cover and extending through the lower portion of the cable connector cover into the recess adjacent to the connectors and aligned with the channels of the cable protectors allowing cables to run from the cable protectors into the recess; and a shell forming the upper portion of the cable connector cover extending upward to a sufficient height to provide a visual indicator to passersby, said shell extending the bottom recess upward within the upper portion of the cable connector cover.

13. The cable connector cover of claim 12 wherein the upper portion is cone-shaped.

14. The cable connector cover of claim 12 wherein the upper portion has a tapered hollow interior extending from the bottom recess upward within the upper portion of the cable connector cover, so that a plurality of cable connector covers can be stacked atop one another.

15. The cable connector cover of claim 12 wherein the upper portion is wall-shaped.

16. The cable connector cover of claim 12 further comprising visual graphics on the upper portion providing information to passersby.

17. The cable connector cover of claim 12 further comprising a connector on the upper portion for removably securing an attachment to the cable connector cover.

18. The cable connector cover of claim 17 wherein the attachment comprises a flexible member for marking a traffic pathway.

19. The cable connector cover of claim 17 wherein the attachment comprises a light.

20. The cable connector cover of claim 17 wherein the attachment comprises a sign.

21. The cable connector cover of claim 12 wherein the cable connector cover has a single piece construction.

22. The cable connector cover of claim 12 wherein the openings face laterally.

23. A cable connector cover for use with modular cable protectors having end connectors and channels for carrying cables and that are supported against a ground surface, said cable connector cover comprising:

a bottom surface contacting the ground surface;

a bottom recess for housing cables and cable connectors, the bottom recess being formed in the bottom surface of the cable connector cover and facing downward;

end connectors on a lower portion of the cable connector cover removably engaging end connectors of adjacent cable protectors;

openings extending through the lower portion of the cable connector cover into the recess adjacent to the connectors and aligned with the channels of the cable protectors allowing cables to run from the cable protectors into the recess; and a shell forming the upper portion of the cable connector cover extending upward to a sufficient height to provide a visual indicator to passersby, said shell extending the bottom recess upward within the upper portion of the cable connector cover.

* * * * *